June 17, 1930. C. MARKEL 1,764,049
CROSSHEAD
Filed Sept. 1, 1921
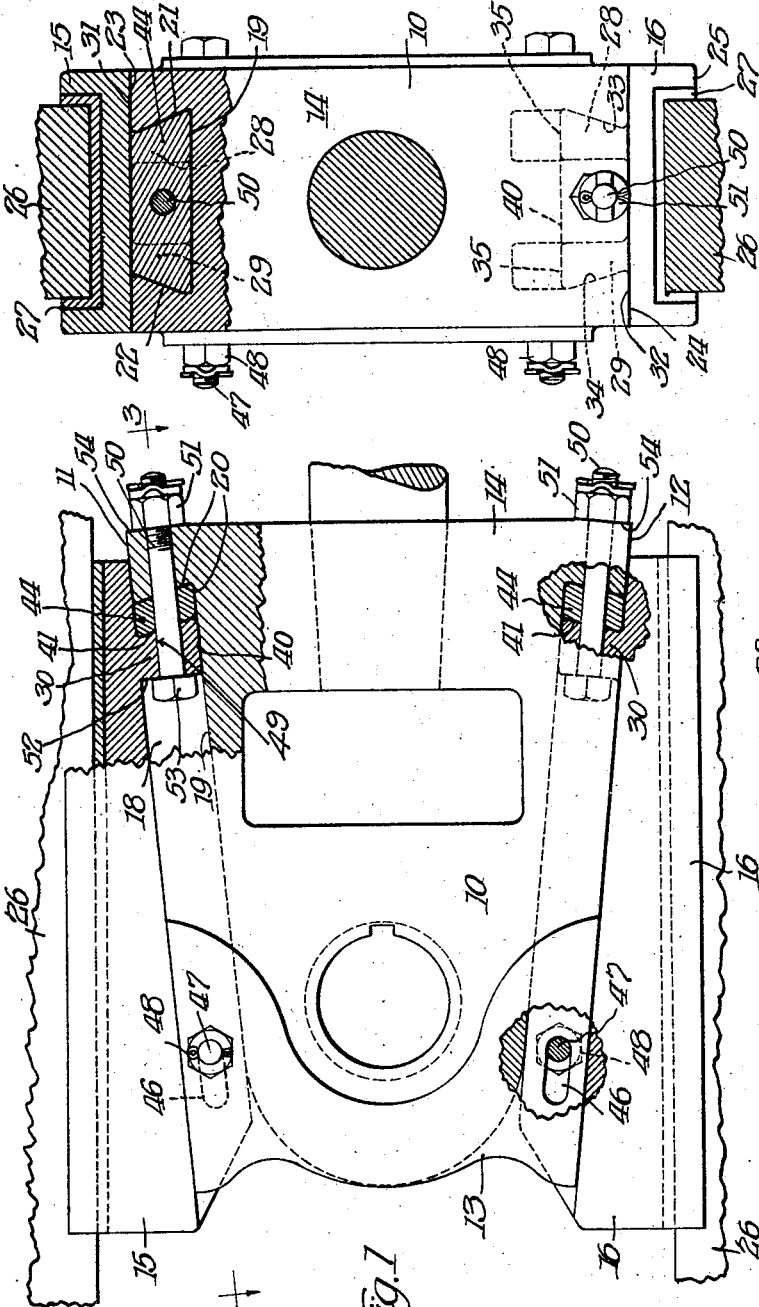
Inventor:
Charles Markel Patented June 17, 1930

1,764,049

UNITED STATES PATENT OFFICE

CHARLES MARKEL, OF SCHENECTADY, NEW YORK, ASSIGNOR TO BARCO MANUFACTURING COMPANY, OF CHICAGO, ILLINOIS, A CORPORATION OF ILLINOIS

CROSSHEAD

Application filed September 1, 1921. Serial No. 497,784.

The present invention relates in general to cross-heads, and more particularly cross-heads having separable shoes, or slippers, and has special reference to the provision of an arrangement for detachably attaching the shoes to the cross-head.

Although hereinafter reference is made of the use of a cross-head in a locomotive, it is, of course, understood to be applicable to any machine in which a similar function is required.

In a locomotive the cross-head reciprocates between guides located immediately to the rear of the cylinders, and forms the pivotal connection between the piston rod and the adjacent end of the pitman or crank. The chief function of the cross-head is to relieve the piston of angular stress from the pitman. The slippers being subject to a greater amount of wear, tear and strain than the cross-head proper, it is often desirable to make them detachable to permit of replacement.

The cross-head as a whole is subject to vibration and shocks and unless special provision is made for securing the slippers to the cross-head, the slippers will work loose not only from wear of the parts and connections but from the vibration.

It is advisable to make provision to prevent this tendency, and in addition, the arrangement and construction for supporting the slippers from the cross-head proper should be such as not only to give their connection the greatest security, but should also be of such a character as will permit of the ready detachability of the slippers from the cross-head.

Among the principal objects of this invention therefore, are the provision of an arrangement for supporting and carrying the slippers from the cross-head proper which will keep them in rigid engagement and which will at the same time permit of the quick and easy dis-assembling of the cross-head and the replacement of the parts thereof, particularly the slippers; the provision of means for taking up any looseness which may develop between the slippers and the cross-head and to bring the two into rigid contact should they work loose either through wear or for any other reason; the provision of a structure of the character referred to wherein I am enabled to so construct and connect the slippers to the cross-head as to provide the greatest structural strength at the points of greatest stress, to distribute the stress and in other ways provide an improved construction; together with such further objects as will appear from the description hereto appended, taken in connection with the drawings.

In these drawings—

Figure 1 is a plan view of the cross-head and shoes, with certain parts broken away;

Figure 2 is an end view, partially in vertical section; and

Figure 3 is a fragmentary sectional view taken along the lines 3—3 of Figure 1.

In the drawings, the cross-head proper is indicated by the numeral 10. The sides 11 and 12 of this cross-head 10 are arranged at an angle to the length so that the cross-head tapers from its point 13 to its rear 14. The two slippers 15 and 16 are secured to the side faces 11 and 12, of the cross-head 10 in a manner now to be described.

The side faces 11 and 12 have channels 18 extending inwardly therefrom, the side walls 19 of which are arranged at substantially the same angle to the length of the cross-head 10 as are the sides 11 and 12. Each of these slots or channels, 18, extend through the cross-head 10 at its rear end for a purpose that will hereinafter appear, and terminates at its front end in the bevelled end wall 20 adjacent the end 13 of the cross-head 10. These slots or channels, 18, are each similarly undercut to provide the downwardly sloping side wall, 21, and an oppositely sloping wall 22.

By means of this arrangement each cross-head, 10, proper is provided on its top with an upper surface 23 and a lower surface 24, the two surfaces diverging toward the end of the cross-head and each surface being angularly parallel to the bottom wall 19 of the adjacent slot or channel 18.

These walls or surfaces 19, 20, 21, 22, 23 and 24 form extending bearing abutment surfaces for a dovetailed connection between the slippers 15 and 16 and the cross-head 10 proper. These slippers are duplicates and each has its outer face 25 parallel to the longitudinal axis of the cross-head and to the outer face of the other, and the slippers slidably engage the parallel guides 26 upon which the cross-head structure as a whole reciprocates.

The engaging faces 25 of the slippers carry the lining plates or bearing brasses 27 which fit over the guides 26.

Each slipper tapers reversely to that of the cross-head proper, from rear to the front thereof. Extending inwardly from the inner face of each slipper are flanges 28 and 29 spaced apart and the end flange 30 as shown in Figure 3. These flanges 28 and 29 are positioned respectively below and above the top and bottom of the slippers 15 and 16. There are thus formed upon the inner face of the slippers the lower and upper bevelled or sloping surfaces 31 and 32 respectively angularly parallel to and engaging the upper and lower surfaces 23 and 24 of the cross-head proper.

The flange 28 extending inwardly from each slipper has its face 33 beveled parallel to the wall 21 of the channel or slot 18 (see Figure 3) and the flange 29 also extending inwardly from each slipper has its surface 34 beveled parallel to the wall 22 of the channel or slot 18.

The inner wall or surface 35 of each of these flanges 28 and 29 is at an angle to the length of the cross-head and parallel to the bottom wall or surface 19 of the channel or slot 18. The end flange 30 (see Figure 1) extends inwardly from each slipper and forms a connecting web for the upper and lower flanges 28 and 29 as shown in Figure 3.

These three flanges 28, 29 and 30 form the box-like structure shown in Figure 3. This flange 30 has its inner wall or surface 40, end wall or surface 41 and walls or surfaces 42 and 43 arranged angularly parallel to the corresponding surfaces of the channel or slot 18, with which each is adapted to co-act.

As will be obvious, the walls or surfaces 42 and 43 are respectively continuations of and in the same plane with the surfaces 33 and 34 of the flanges 28 and 29, respectively. So also the inner surface 40 of this flange 30 is a continuation of and in the same plane with the inner end walls 35 of the flanges 28 and 29.

Loosely mounted in each channel or slot 18, of the cross-head proper and between the flange 45 of the cross-head 10 and flange 30 is a block or wear piece 44 having all of its six surfaces parallel to the various adjacent abutting surfaces with which each co-act.

To secure the slipper rigidly to the cross-heads and yet to permit of their adjustment as set forth above, I provide the flanges 28 and 29 of each slipper adjacent its rear end with slots 46, each with its long axis angularly arranged parallel to the inner surface of the slipper. Extending through holes in the upper and lower surface of the cross-head and through the slots or openings 46 are bolts 47 screw-threaded at their upper ends to receive nuts 48.

To further secure the slippers to the cross-head and to make provision for drawing the slippers forwardly to firmly secure the slippers to the cross-head, I provide registering holes through the flange 30, block 44 and flange 45, thus forming a passage 49 angularly arranged parallel to the end wall 19 of the channel 18. Through this channel 49 is passed the bolt 50, screw-threaded at its outer end to receive the nut 51.

Upon inspection of Figure 1 it will be noticed that the rear wall or surface 52 against which the bolt head 53 abuts is not parallel to the surface 41 etc. The front end of the cross-head 10 is beveled off at 54 to make this surface parallel with the surface 52 for reasons that will be obvious to anyone skilled in the art.

By having the surfaces 52 and 41 arranged angularly to each other as described, the pulling force of the bolt head 53 upon the flange 30 in the direction of the length of the bolt 50 will cause the surface 41 thereof to co-act with the adjacent surface of the loose block or wear member 44, to force the slipper laterally toward the longitudinal central line of the cross-head proper. In this manner any looseness that may occur between the bolt head and the parts through which it passes will be compensated for.

In assembling the cross-head structure, the block 44 is first placed in position in the channel 18. The bolt 50 is then placed in position in the hole through the flange 30 and the flanges 28 and 29 placed in register with and to the rear of the channel or slots 18. The slipper is now moved toward the end of the cross-head proper until the bolt 50 passes completely through the channel 49, and the nut 51 is then placed on the screw-threaded portion thereof.

The bolt 47 is now passed through the holes in the cross-head proper and the slotted openings 46 through the flanges 28 and 29 of the slipper and the nut 48 placed thereon. The nut 51 is now tightened on the bolt 50 which will cause the bolt head 53 to pull the slipper toward the front of the cross-head in a direction oblique to the longitudinal central line through the cross-head.

In this operation the engagement of the sides of the hole in the flange 40 with the bolt, and the engagement of the sides of the slot opening 46 with the bolt 47, will keep the slipper to a right line movement.

By arranging the surface 52 at a slight angle to the surface 41, there will be a tendency of the slipper to move laterally toward the central longitudinal line through the cross-head for the purposes set forth previously. Having adjusted the nuts 51, as aforesaid, the nuts 48 are now tightened to secure the slipper in position, with the flanges 28 and 29 of the slipper held between the surfaces 21 and 22 of the channel or slot 18.

It will be noticed particularly that I arrange the flanges 28 and 29 so that they will co-act not only with the surfaces 21 and 22 of the cross-head, but so that they engage with the wall 19 of the channel or slot 18.

By giving the cross-head and the slipper the form described, the advantages previously set forth will be obtained. A marked advantage results from the fact that in disassembling the slippers can be more easily detached from the cross-head proper.

A further marked advantage of the present invention residing in the provision of the member 44 is that as this member snugly contacts with all of the surfaces of the abutment 30, abutment 11 and surfaces of the cross head, it will be obvious that the wear imposed is distributed and therefore materially compensated for by the member 44. In other words, wear which would directly occur on the surfaces of contact between the abutment 30 and abutment 11 are equally distributed on to the opposed surfaces of the block 44 and thus the amount of wear on the cross head and shoe proper is reduced. This holds good whether the member 44 is made of a material of the same hardness as, or of a softer degree than, the cross head and shoe.

It follows that, as the block 44 is in snug contact with all of the adjacent surfaces of the cross head and shoe, it tends to cause a self-centering of the shoe on the cross head as when the nut 51 is screwed home it pulls all of the parts snugly together and therefore there can be no lateral displacement of the shoe on the cross head.

Even though wear progresses on the cross head and shoe, in each instance it is desirable that the shoe be pulled toward the cross head rather than away from it, and the inclined surface 41 and the inclined surface 20 further assist in snugly bringing the shoe into contact with the cross head.

Having thus described my invention and illustrated its use, what I claim as new and desire to secure by Letters Patent is—

1. In a cross-head structure, in combination, a cross-head and a slipper movable longitudinally thereof for adjustment, the cross-head proper and the slipper having surfaces co-operating in the direction of adjustment of said slipper, and a replaceable wear compensating thrust absorbing piece between said co-operating surfaces.

2. In a cross-head structure, in combination, a cross-head and a slipper movably supported by said cross-head proper for adjustment relatively thereto, abutments on said slipper and cross-head proper, and a replaceable thrust absorbing block positioned between and in direct contact with both of said abutments, whereby compensation for wear is provided for.

3. In a cross-head structure, in combination, a cross-head and a slipper mounted for longitudinal adjustment on said cross-head, co-acting surfaces on said members, and a beveled wear compensating block between said surfaces.

4. In a cross-head structure, in combination, a cross-head and a slipper, said slipper and cross-head being reversely tapered to compensate for wear of the slipper, and means parallel to the angle of taper for securing said slipper to said cross-head.

5. In a cross-head structure, in combination, a cross-head having an outer surface and a slipper receiving recess therein, both extending longitudinally at an angle to the longitudinal axis of the cross-head and a slipper received in said recess and movable longitudinally therein to compensate for wear.

6. In a cross-head structure, in combination, a cross-head and a slipper mounted thereon, said slipper and cross-head having a dovetailed connection whereby they may be longitudinally adjusted to compensate for wear and opposed end walls, a wear compensating block between and in contact with said walls, and means for fixing said cross-head and slipper in predetermined position.

7. In a cross-head structure, in combination, a cross-head and a slipper, said cross-head and slipper having engaging surfaces extending longitudinally of the cross-head and arranged at an angle to the length of the cross-head, whereby a compensation for wear is provided, and means arranged parallel to said surfaces for adjusting and securing said surface in engagement.

8. In a cross-head structure, in combination, a cross-head and a slipper mounted thereon, said slipper and cross-head having an inclined dovetailed connection whereby they may be longitudinally adjusted to compensate for wear and opposed end walls, a wear compensating block between and in contact with said walls, and means for fixing said cross-head and slipper in predetermined position.

9. In a cross-head structure, in combination, a cross-head, a slipper movably supported thereon, for adjustment relatively thereto, the cross-head proper and the slipper having abutting surfaces arranged at an angle other than to the right angle to the longitudinal axis of the cross-head, and adapted to bring the movable portion in complete contacting engagement and means for holding said surfaces in engagement comprising surfaces upon said cross-head proper and said slipper parallel to each other and at an angle to said aforementioned engaging surfaces.

10. In a cross-head structure, in combination, a cross-head and a slipper adjustably supported therefrom, the two having engaging surfaces arranged at an angle to the longitudinal axis of the cross-head proper, a longitudinal bolt for adjusting said elements arranged parallel to said surfaces and means for locking said slipper in a predetermined adjusted position, comprising a bolt carried by one member and an elongated slot in the other member.

11. In a cross-head structure, in combination, a cross-head having an inclined surface, and a slipper mounted thereon for longitudinal adjustment and having a complemental inclined surface and means for holding said slipper in its longitudinal adjustment comprising two members at right angles to each other one of which members is in a plane parallel to said surfaces.

12. In a cross-head structure, in combination, a cross-head, a slipper mounted thereon and means for adjustment of the slipper obliquely of the axis of the cross-head proper comprising two members at substantially right angles to each other one of which members is arranged obliquely to the axis of the cross-head proper.

13. In a cross-head structure, in combination, a cross-head and a slipper supported therefrom, provided with an element adapted to take the resultant of the reciprocating thrust said element having its opposite faces parallel to each other, one of said parallel faces being in engagement with the cross-head proper and the other of said parallel faces with a member adjustable on the cross-head.

14. In a cross-head structure, in combination, a cross-head having an inclined surface, a slipper mounted thereon for longitudinal adjustment and having a complemental inclined surface, a longitudinal member in a plane parallel to the planes of said surfaces for drawing the slipper relatively to the cross-head, and a transverse member for holding the slipper and body in adjusted position.

In testimony whereof I have hereunto signed my name.

CHARLES MARKEL.